(12) United States Patent
Hara (10) Patent No.: US 10,344,815 B2
(45) Date of Patent: Jul. 9, 2019

(54) ELECTRIC BRAKE DEVICE

(71) Applicant: TOYOTA JIDOSHA KABUSHIKI KAISHA, Toyota-shi, Aichi-ken (JP)

(72) Inventor: Yukio Hara, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 19 days.

(21) Appl. No.: 15/816,641

(22) Filed: Nov. 17, 2017

(65) Prior Publication Data

US 2018/0202504 A1     Jul. 19, 2018

(30) Foreign Application Priority Data

Jan. 16, 2017   (JP) .................................. 2017-004856

(51) Int. Cl.
| | | |
|---|---|---|
| *F16D 65/18* | (2006.01) | |
| *F16D 125/48* | (2012.01) | |
| *F16D 125/40* | (2012.01) | |
| *F16D 121/24* | (2012.01) | |

(52) U.S. Cl.
CPC .......... *F16D 65/18* (2013.01); *F16D 65/183* (2013.01); *F16D 2121/24* (2013.01); *F16D 2125/40* (2013.01); *F16D 2125/48* (2013.01)

(58) Field of Classification Search
CPC .. F16D 65/18; F16D 2121/24; F16D 2125/18; F16D 2125/20; F16D 2125/44; F16D 2125/58; F16D 55/225; F16D 65/0068
See application file for complete search history.

(56) References Cited

U.S. PATENT DOCUMENTS

| | | | | |
|---|---|---|---|---|
| 8,235,181 | B2 * | 8/2012 | Sano ..................... | B60T 13/746 188/156 |
| 2015/0167761 | A1 * | 6/2015 | Son ..................... | F16D 65/0006 188/72.6 |
| 2015/0362032 | A1 * | 12/2015 | Son ......................... | F16D 65/18 188/72.1 |

FOREIGN PATENT DOCUMENTS

| | | | |
|---|---|---|---|
| JP | 03168452 | * | 7/1991 |
| JP | 03168454 | * | 7/1991 |
| JP | 05187493 | * | 7/1993 |
| JP | 2003-184920 A | | 7/2003 |
| JP | 2016-151356 A | | 8/2016 |
| JP | 2016-179797 A | | 10/2016 |

* cited by examiner

*Primary Examiner* — Vishal R Sahni
(74) *Attorney, Agent, or Firm* — Oliff PLC (57) ABSTRACT

An electric brake device configured to brake a wheel or to maintain a stopped state of the wheel, including: a friction member; a piston configured to advance for pushing the friction member onto a rotary body; a motion converting mechanism having an input shaft and configured to convert rotation of the input shaft into an advancing and retracting movement of the piston; an electric motor; and a rotation transmitting mechanism configured to transmit rotation of the electric motor as the rotation of the input shaft, the rotation transmitting mechanism including a drive pulley connected to the electric motor, a driven pulley connected to the input shaft, a belt wound around the two pulleys, and a speed change mechanism configured to change a ratio of a rotation speed of the driven pulley to a rotation speed of the drive pulley in dependence on tension of the belt between the two pulleys.

7 Claims, 7 Drawing Sheets

FRONT ⟵⟶ REAR

FRONT ⟵⟶ REAR

ELECTRIC BRAKE DEVICE

CROSS REFERENCE TO RELATED APPLICATION

The present application claims priority from Japanese Patent Application No. 2017-004856, which was filed on Jan. 16, 2017, the disclosure of which is herein incorporated by reference in its entirety.

BACKGROUND

Technical Field

The present disclosure relates to an electric brake device installed on a vehicle.

Description of Related Art

There is proposed, as a brake device installed on a vehicle, an electric brake device as described in JP-A-2016-179797, for instance. The brake device is configured such that a piston (which is referred to as "rod" in JP-A-2016-179797) is advanced by rotation of an electric motor, so as to push a friction member onto a rotary body that rotates with a wheel. The disclosed electric brake device includes a motion converting mechanism for converting the rotation of the electric motor into an advancing movement of the piston and a rotation transmitting mechanism for transmitting the rotation of the electric motor as rotation of an input shaft of the motion converting mechanism. As the rotation transmitting mechanism of the electric brake device, a rotation transmitting mechanism as described in JP-A-2003-184920 is proposed, for instance. The rotation transmitting mechanism is a belt-type rotation transmitting mechanism including two pulleys and a belt wound around the pulleys.

SUMMARY

The electric brake device described above is still under development, and it is possible to provide a more practical electric brake device by making some improvement. An aspect of the present disclosure relates to an electric brake device having a higher degree of utility.

In one aspect of the disclosure, the electric brake device includes the belt-type rotation transmitting mechanism which is provided with a speed change mechanism configured to change a rotation speed ratio of the two pulleys in dependence on tension of the belt.

In general, tension of the belt increases with an increase in the magnitude of a force that moves the piston. The rotation speed ratio of the rotation transmitting mechanism is changed in dependence on the tension, whereby it is possible to generate a larger braking force or to increase an operating speed of the brake device, depending upon situations. The electric brake device of the present disclosure has a higher degree of utility by making use of the advantage.

FORMS OF THE INVENTION

There will be exemplified and explained various forms of an invention that is considered claimable. (The invention will be hereinafter referred to as "claimable invention" where appropriate). Each of the forms is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following description of various forms and embodiments. It is to be further understood that, as long as the claimable invention is construed in this way, any form in which one or more constituent elements is/are added to or deleted from any one of the following forms may be considered as one form of the claimable invention. Various forms of the claimable invention may provide an invention described in claims.

(1) An electric brake device configured to brake a wheel or to maintain a stopped state of the wheel, comprising:
(a) a friction member to be pushed onto a rotary body configured to rotate with the wheel;
(b) a piston configured to advance so as to push the friction member onto the rotary body;
(c) a motion converting mechanism having an input shaft and configured to convert rotation of the input shaft into an advancing and retracting movement of the piston;
(d) an electric motor as a drive source; and
(e) a rotation transmitting mechanism configured to transmit rotation of the electric motor as the rotation of the input shaft,
wherein the rotation transmitting mechanism includes
e-1) a drive pulley connected to the electric motor,
e-2) a driven pulley connected to the input shaft,
e-3) a belt wound around the drive pulley and the driven pulley, and
e-4) a speed change mechanism configured to change a ratio of a rotation speed of the driven pulley to a rotation speed of the drive pulley in dependence on tension of the belt between the drive pulley and the driven pulley.

The electric brake device according to this form includes the speed change mechanism. That is, the so-called belt-type rotation transmitting mechanism of the electric brake device is equipped with the speed change mechanism. The speed change mechanism is formed as the so-called belt-type speed change mechanism configured to change the ratio of the rotation speed of the driven pulley to the rotation speed of the drive pulley. (The ratio will be hereinafter referred to as "rotation speed ratio" where appropriate.) The speed change mechanism changes the rotation speed ratio in dependence on the tension of the belt. In general, the tension of the belt increases with an increase in the magnitude of a force that advances the piston, namely, the tension of the belt increases with an increase in the magnitude of a braking force generated by the electric brake device. That is, the tension of the belt changes depending upon situations. According to the present electric brake device, the speed change mechanism enables a larger braking force to be generated or enables the piston to move faster, depending upon situations.

The "speed change mechanism" of this form may be configured to detect the tension of the belt and to change the rotation speed ratio by actuating a suitable actuator while controlling the actuator in accordance with the detected tension. In terms of simplification of the structure, the speed change mechanism is preferably configured such that the rotation speed ratio automatically changes in accordance with a change in the tension. In other words, the speed change mechanism is preferably configured such that the rotation speed ratio automatically changes in accordance with a change in the tension of the belt not based on a process such as detection of the tension or control of the actuator but based on an absolutely mechanical action without including any electric process. The speed change mechanism of this form may be configured to change the rotation speed ratio continuously or to change the rotation speed ratio in steps.

In this form, the drive pulley and the driven pulley which constitute the speed change mechanism are respectively connected to the electric motor and the input shaft of the motion converting mechanism. Each of the pulleys may be connected directly or indirectly. That is, the drive pulley may be connected directly to an output shaft of the electric motor, and the driven pulley may be connected directly to the input shaft of the motion converting mechanism. Alternatively, the drive pulley and the driven pulley may be connected to the respective shafts via a suitable mechanism such as a speed reducer.

The electric brake device of this form is for braking a wheel or for maintaining a stopped state of the wheel. That is, the electric brake device may function as the so-called service brake configured to generate a braking force in accordance with an operation of a brake operation member or may function as the so-called parking brake configured to prevent a vehicle from moving when the vehicle is parked. Further, the electric brake device may function as both of the service brake and the parking brake.

(2) The electric brake device according to the form (1), wherein the speed change mechanism is configured to change the ratio such that the ratio is smaller when the tension of the belt is large than when the tension is small.

In ordinary brake devices, there exists a clearance between the rotary body and the friction member and between the friction member and the piston. In this configuration, it takes some time before the friction member comes into contact with the rotary body by being pushed by the piston after the piston has been advanced from its retracted end position. This time is referred to as a piston-idly-moving time, and the operation state of the brake device in that time is referred to as a piston-idly-moving state. From the viewpoint of response of the brake device, the piston-idly-moving time is preferably made as short as possible. In the piston-idly-moving state, the piston only receives a force enough for advancing the piston. When the friction member comes into contact with the rotary body and the braking force is generated, namely, when a braking-force generating state is established, a large force acts on the piston. As explained above, the tension that acts on the belt of the speed change mechanism depends on the magnitude of the braking force. Thus, the tension is small in the piston-idly-moving state while the tension is large in the braking-force generating state. The brake device is required to generate, in the braking-force generating state, the braking force as large as possible by a force of the electric motor whose size is as small as possible.

The speed change mechanism of this form enables the rotation speed ratio to be large in the piston-idly-moving state and enables the rotation speed ratio to be small in the braking-force generating state. That is, it is possible to advance the piston at a comparatively high speed in the piston-idly-moving state and to generate, in the braking-force generating state, a comparatively large braking force by the force of the electric motor whose size is comparatively small.

The speed change mechanism of this form may be configured to change the rotation speed ratio depending on whether the tension is larger or smaller than set threshold tension or may be configured to change the rotation speed ratio continuously or in steps depending on a change in the tension. In the latter configuration, the rotation speed ratio is not necessarily required to be changed over an entire range of expected tension, but may be changed in a specific range thereof.

(3) The electric brake device according to the form (1) or (2),
wherein at least one of the drive pulley and the driven pulley is a speed change pulley including (A) a pair of pulley plates disposed so as to sandwich the belt therebetween in an axial direction and engaging with the belt on inclined surfaces of the respective pulley plates and (B) a biasing member biasing at least one of the pulley plates such that the pulley plates relatively move toward each other, the speed change pulley being configured such that, when the tension of the belt becomes larger than set tension, a spacing between the pulley plates is increased against a biasing force of the biasing member, so that a pulley radius of the speed change pulley becomes smaller, the pulley radius being a radius of a portion of the speed change pulley at which the belt engages with the speed change pulley, and
wherein the speed change mechanism is constituted by at least one of the drive pulley and the driven pulley provided as the speed change pulley.

This Ruin adds limitation as to a speed change method employed by the speed change mechanism. This form allows the change of the rotation speed ratio in dependence on the tension of the belt owing to the structure of the speed change pulley. The specific structure of the speed change pulley will be later explained in detail. In an instance where this form is combined with the above-indicated form in which the rotation speed ratio is small when the tension of the belt is large, at least the drive pulley is preferably provided as the speed change pulley.

(4) The electric brake device according to the form (3), wherein the speed change pulley includes a stopper configured to prevent the spacing between the pulley plates from becoming larger than a set spacing.

(5) The electric brake device according to the form (3) or (4), wherein the speed change pulley includes a stopper configured to prevent the spacing between the pulley plates from becoming smaller than a set spacing.

According to the two forms described above, a range of the rotation speed ratio to be changed, namely, an upper limit or a lower limit of the rotation speed ratio, is determined depending on the function of the stopper.

(6) The electric brake device according to the form (1) or (2),
wherein at least one of the drive pulley and the driven pulley is a speed change pulley including an engaging portion having a pair of inclined surfaces which face each other on an outer circumference of the speed change pulley, the inclined surfaces being configured such that a spacing therebetween decreases toward a center of the speed change pulley, the belt engaging with the speed change pulley on the inclined surfaces,
wherein the belt has a configuration in which a position of the belt at which the belt engages with the engaging portion becomes closer to the center of the speed change pulley with an increase in the tension of the belt, in dependence on elastic deformation of the belt itself, and
wherein the speed change mechanism is constituted by:
the speed change pulley provided by the at least one of the drive pulley and the driven pulley; and the belt having the configuration.

This form adds limitation as to another speed change method employed by the speed change mechanism different from the speed change method described above. This form allows the change of the rotation speed ratio in dependence on the tension of the belt owing to mainly the configuration of the belt. The specific configuration of the belt will be later explained in detail. In an instance where this form is combined with the above-indicated form in which the rotation speed ratio is small when the tension of the belt is large, at least the drive pulley is preferably provided as the speed change pulley.

BRIEF DESCRIPTION OF THE DRAWINGS

The objects, features, advantages, and technical and industrial significance of the present disclosure will be better understood by reading the following detailed description of embodiments, when considered in connection with the accompanying drawings, in which.

DETAILED DESCRIPTION OF THE EMBODIMENTS

Referring to the drawings, there will be explained below in detail electric brake devices according to embodiments of the claimable invention. It is to be understood that the claimable invention is not limited to the details of the following embodiments and the forms described in Forms of the Invention, but may be changed and modified based on the knowledge of those skilled in the art.

First Embodiment

A. Basic Structure of Electric Brake Device

Figure 1:
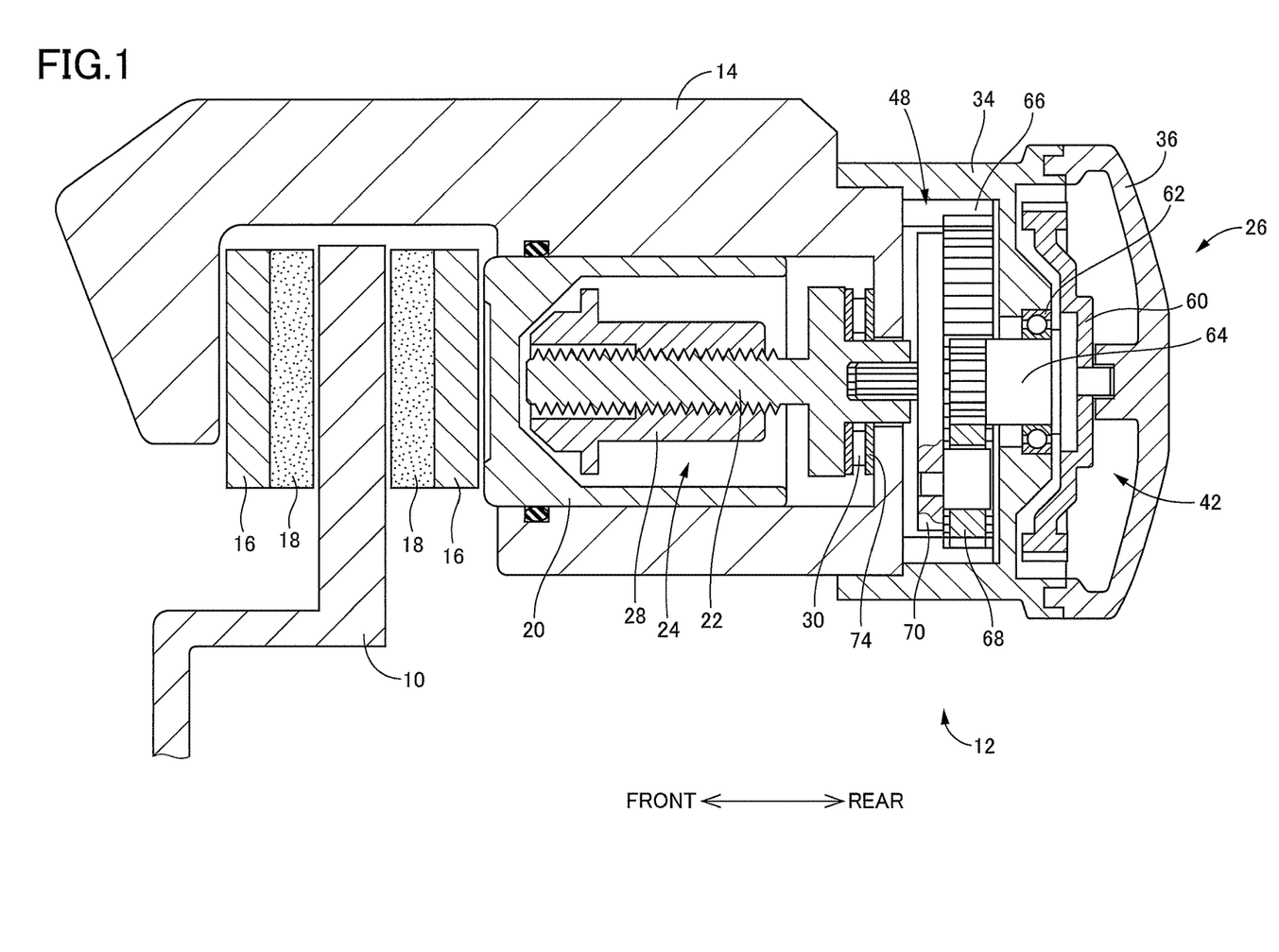
FIG. 1 is a cross-sectional view showing an overall structure of an electric brake device according to a first embodiment.

An electric brake device according to a first embodiment is a disc brake device. As shown in FIG. 1, the electric brake device includes: a disc rotor 10, as a rotary body, configured to rotate with a wheel; and a brake caliper 12 held by a carrier (not shown) that rotatably holds the wheel. The brake caliper 12 is held by the carrier so as to be movable in a direction in which a rotation axis of the wheel extends. In the following description, a left side and a right side in FIG. 1 will be referred to as a front side and a rear side, respectively. The direction in which the rotation axis of the wheel extends, namely, a right-left direction in FIG. 1, will be referred to as an axial direction.

The brake caliper 12 includes: a caliper main body 14; a pair of brake pads 18, as friction members, each of which is supported by the caliper main body 14 via a corresponding one of backup plates 16; a piston 20 held by the caliper main body 14 so as to be movable in the axial direction and unrotatable about the axis; a motion converting mechanism 24 having an input shaft 22 and configured to convert rotation of the input shaft 22 into an advancing and retracting movement of the piston 20; and a drive unit 26.

The piston 20 is a cylindrical member having a closed front end. The motion converting mechanism 24 includes the input shaft 22 and an output sleeve 28. An external thread is formed on the input shaft 22 while an internal thread is formed on the output sleeve 28, whereby the input shaft 22 and the output sleeve 28 are threadedly engaged with each other. The input shaft 22 has a flange. The input shaft 22 is rotatably held at its flange by a rear end wall of the caliper main body 14 through a thrust roller bearing 30. The output sleeve 28 is disposed in an inner space of the piston 20 such that the output sleeve 28 is prohibited from rotating about the axis by a rotation prohibiting mechanism (not shown). When the output sleeve 28 is advanced by rotation of the input shaft 22, a front end of the output sleeve 28 comes into contact with the piston 20, so that the piston 20 is advanced. When the output sleeve 28 is retraced by reverse rotation of the input shaft 22, the piston 20 is allowed to be retracted. A rear-end shaft portion of the input shaft 22 has a hole in which serrations are formed.

Figure 2:
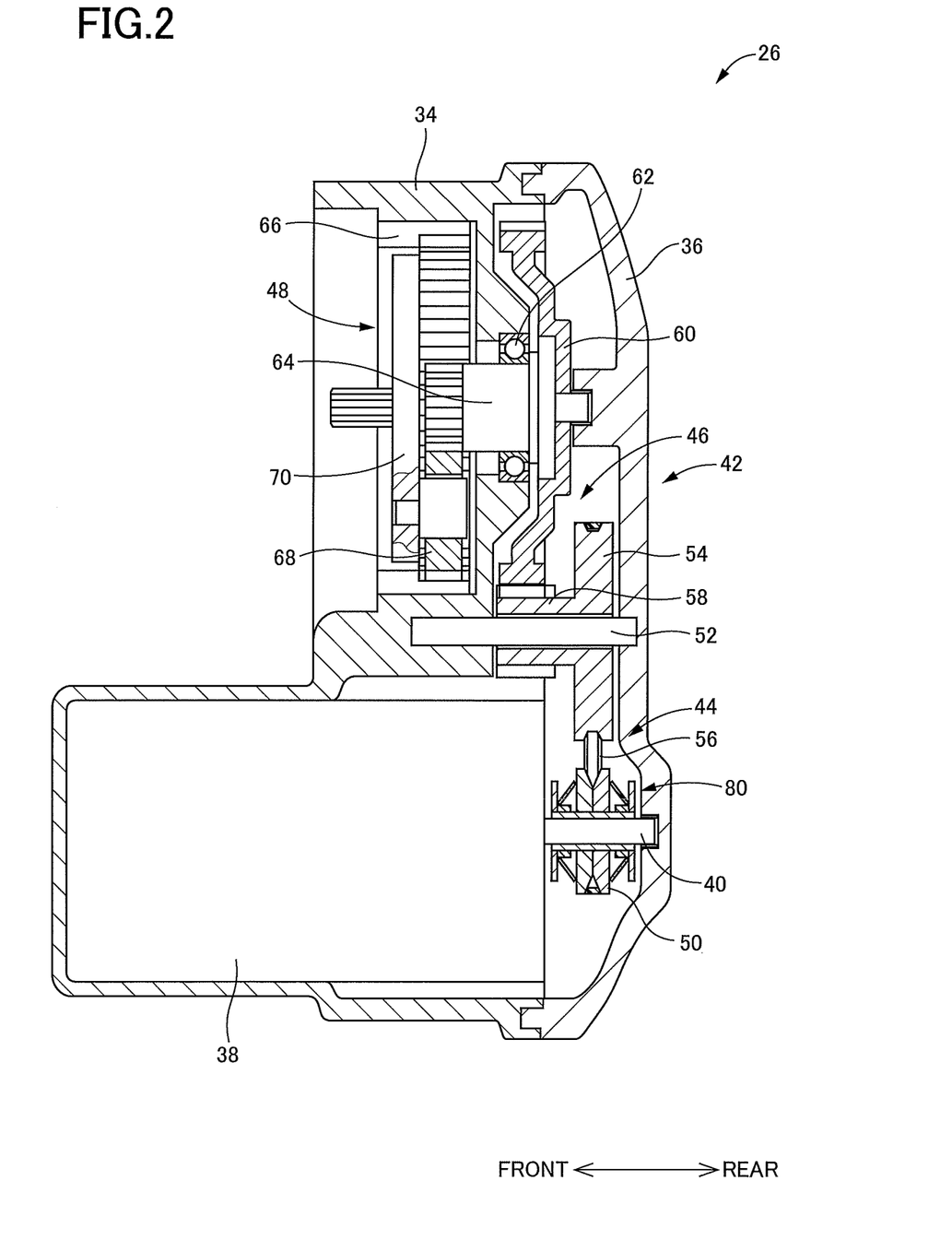
FIG. 2 is a cross-sectional view of a drive unit of the electric brake device according to the first embodiment.

Referring also to FIG. 2 showing the drive unit 26 in horizontal cross section, the drive unit 26 includes: a base body 34 into which a rear end portion of the caliper main body 14 is fitted and which is fixed to the caliper main body 14; a lid 36 which covers the base body 34 from the rear side so as to be fixed to the base body 34 and which defines a housing of the drive unit 26 with the base body 34; an electric motor 38, as a drive source, fixed to the base body 34; and a rotation transmitting mechanism 42 disposed in the housing and configured to transmit rotation of the electric motor 38, in a strict sense, rotation of a motor shaft 40 which is an output shaft of the electric motor 38, as the rotation of the input shaft 22 of the motion converting mechanism 24. Specifically, the rotation transmitting mechanism 42 includes a belt-type transmitting mechanism 44, a first speed reducer 46, and a second speed reducer 48.

The belt-type transmitting mechanism 44 includes: a drive pulley 50 attached to the motor shaft 40; a driven pulley 54 supported by a fixed shaft 52 that is fixed to the base body 34, such that the driven pulley 54 is rotatable about the fixed shaft 52; and a belt 56 wound around the drive pulley 50 and the driven pulley 54. The belt-type transmitting mechanism 44 is configured to transmit rotation of the drive pulley 50, namely, the rotation of the electric motor 38, to the driven pulley 54.

The first speed reducer 46 is constituted by a shaft portion 58 of the driven pulley 54 on which teeth are formed; and a large-diameter gear 60 on which teeth engaging with the teeth of the shaft portion 58 portion are formed. The large-diameter gear 60 is a spur gear having a comparatively large diameter. The first speed reducer 46 is configured to decelerate rotation of the driven pulley 54 and to transmit the decelerated rotation to an intermediate shaft 64 which is integral with the large-diameter gear 60 and which is rotatably held by the base body 34 through radial ball bearings 62.

Teeth are formed on a front end portion of the intermediate shaft 64. The second speed reducer 48 is a planetary gear type speed reducer constituted by: the intermediate shaft 64 that functions as a sun gear; a ring gear 66 fixed to the base body 34 so as to be coaxial with the intermediate shaft 64; a plurality of planetary gears 68 (only one of which is illustrated in FIGS. 1 and 2) which are in mesh with both of the front end portion of the intermediate shaft 64 and the ring gear 66 and which rotate around the intermediate shaft 64 in the circumferential direction; and a carrier 70 which rotatably holds the planetary gears 68 and which rotates about the same axis as the intermediate shaft 64. The second speed reducer 48 is configured to decelerate rotation of the intermediate shaft 64 and to transmit the decelerated rotation as rotation of the carrier 70. A front end shaft portion of the carrier 70 is serrated, and the carrier 70 and the input shaft 22 of the motion converting mechanism 24 are held in serration engagement with each other.

Figure 3A:
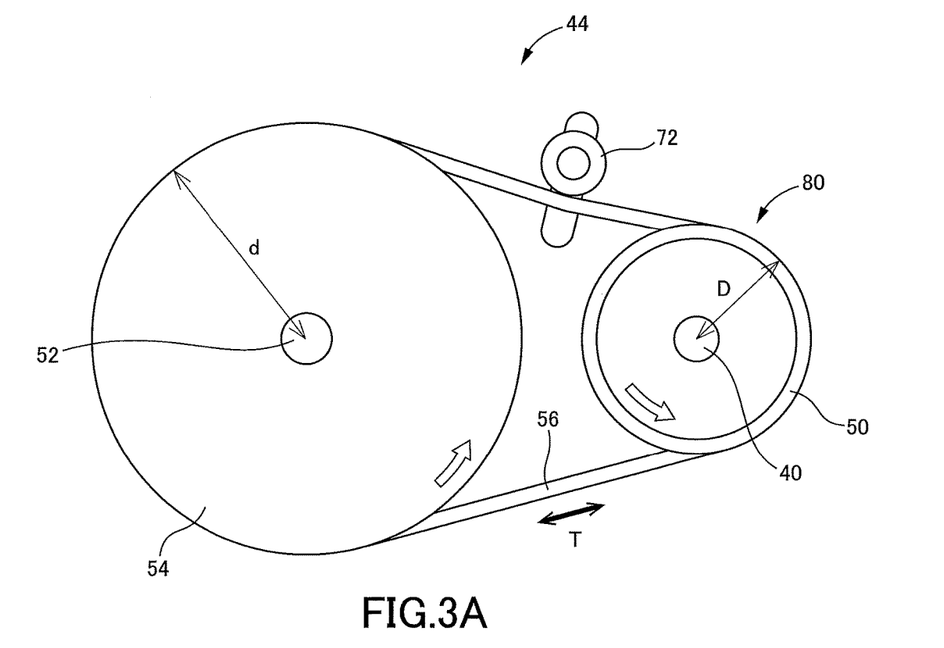
FIGS. 3A and 3B are views each showing a belt-type transmitting mechanism of the drive unit of FIG. 2 as seen in an axial direction.

As apparent from FIG. 3A in which the belt-type transmitting mechanism 44 is seen in the axial direction, the belt-type transmitting mechanism 44 is provided with a tension roller 72 for preventing slack of the belt 56.

The electric motor 38 rotates the input shaft 22 of the motion converting mechanism 24 through the belt-type transmitting mechanism 44, the first speed reducer 46, and the second speed reducer 48 constructed as described above, so that the output sleeve 28 is advanced or retracted in the axial direction by the rotation of the input shaft 22. Forward rotation of the electric motor 38 causes the output sleeve 28 to be advanced. The advancing movement of the output sleeve 28 causes the piston 20 to be advanced, so that the brake pads 18 are pushed onto the disc rotor 10. The electric brake device generates a braking force for braking the wheel or for maintaining a stopped state of the wheel by the pushing of the brake pads 18 onto the disc rotor 10. In this respect, negative efficiency (reverse efficiency) of the motion converting mechanism 24 is considerably low, and the motor shaft 40 of the electric motor 38 does not rotate even when the piston 20 is advanced or retracted. Consequently, the electric motor 38 is rotated reversely by supplying electric current thereto, so as to retract the piston 20.

The braking force depends on the pushing force of the brake pads 18 by which the brake pads 18 push the disc rotor 10. That is, the braking force depends on the torque generated by the electric motor 38, namely, the electric current supplied to the electric motor 38. For detecting the braking force, the electric brake device is equipped with an axial force sensor 74 configured to detect an axial force which is a force in the axial direction that acts on the input shaft 22. The axial force may also be referred to as a thrust force. The axial force sensor 74 is disposed between the thrust roller bearing 30 and the rear end wall of the caliper main body 14. In an instance where the electric brake device functions as the service brake device, the electric current supplied to the electric motor 38 is controlled based on the axial force value detected by the axial force sensor 74, so as to obtain the braking force in accordance with an operation of a brake operation member (e.g., brake pedal) by a driver.

On the other hand, in an instance where the electric brake device functions as the parking brake, the electric current based on the axial force detected by the axial force sensor 74 is supplied to the electric motor 38 in accordance with an operation on a suitable switch made by the driver when the vehicle is at a stop, so as to obtain a set braking force. Then the supply of the electric current is stopped. As explained above, the negative efficiency of the motion converting mechanism 24 is considerably low. Consequently, even when the supply of the electric current to the electric motor 38 is stopped, the braking force being generated is maintained.

B. Speed Change Mechanism

In the electric brake device constructed as described above, there is a clearance, as in ordinary brake devices, between the disc rotor 10 and each brake pad 18 and between the piston 20 and the backup plate 16 supporting the brake pad 18, in a state in which the piston 20 is located at its retracted end position. Consequently, it takes some time before the brake pads 18 come into contact with the disc rotor 10 after the output sleeve 28 has advanced from its retracted end position. This time may be referred to as a piston-idly-moving time in which the piston 20 is advancing without giving any force to the brake pads 18. That is, the electric brake device is placed in a piston-idly-moving state. In view of the response of the electric brake device, the piston-idly-moving time is preferably a short time.

As explained above, the braking force depends on the torque generated by the electric motor 38. After the brake pads 18 have come into contact with the disc rotor 10 by being pushed, namely, when the electric brake device is placed in a braking-force generating state in which the braking force is generated, it is desirable to obtain a large braking force by the torque as small as possible. That is, it is desirable to employ the electric motor 38 having a smaller size in terms of a reduction in size and weight of the electric brake device.

To respond to such a desire, the rotation transmitting mechanism 42 of the present electric brake device has a speed change mechanism 80, as shown in FIG. 2. Specifically, the speed change mechanism 80 is provided in the belt-type transmitting mechanism 44. More specifically, the drive pulley 50 is a principal element of the speed change mechanism 80.

Figure 4A:
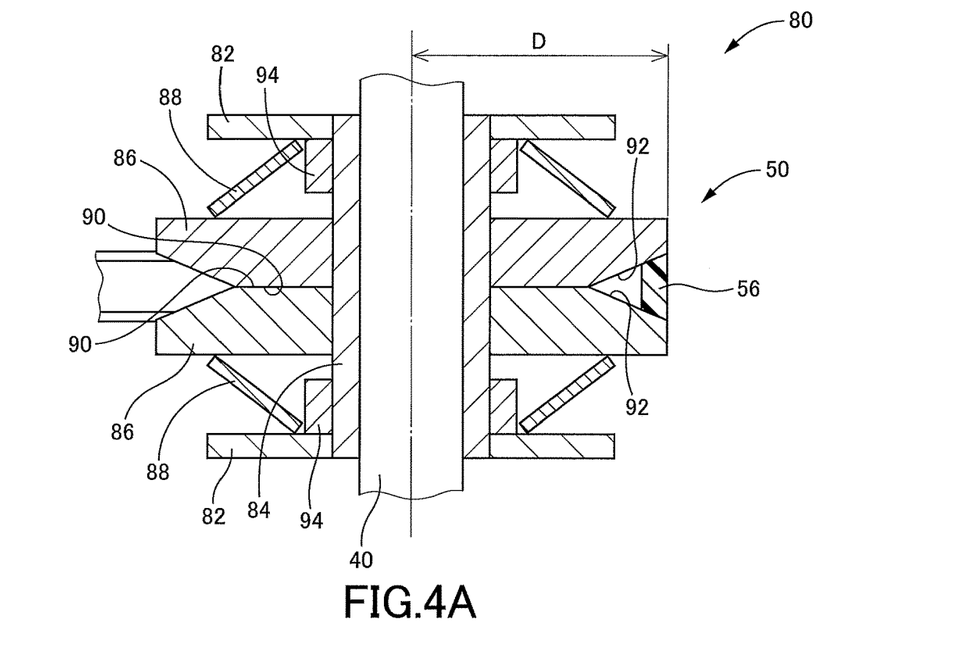
FIGS. 4A and 4B are cross-sectional views each showing a drive pulley that constitutes a speed change mechanism of the drive unit of FIG. 2.

Referring also to FIG. 4A, the speed change mechanism 80 will be explained. A sleeve 84 having a pair of flanges 82 which are formed at its axially opposite ends is fixed to the motor shaft 40 of the electric motor 38. A pair of pulley plates 86 are fitted on the sleeve 84 so as to be movable in the axial direction and unrotatable. The drive pulley 50 is constituted by the pair of pulley plates 86.

The pair of pulley plates 86 are biased by a pair of disc springs 88, each as a biasing member, such that the pulley plates 86 move toward each other. Each of the disc springs 88 is disposed between a corresponding one of the pulley plates 86 and a corresponding one of the flanges 82. Surfaces of the respective pulley plates 86 that face each other are stopper surfaces 90 each functioning as a stopper, and the pulley plates 86 are in contact with each other. That is, a spacing between the pulley plates 86 is prevented from becoming smaller than a set spacing. The pulley plates 86 include respective inclined surfaces 92 formed on respective outer circumferences so as to face each other. The pulley plates 86 are held in engagement with the belt 56 on the respective inclined surfaces 92. In other words, the pulley plates 86 are disposed so as to sandwich the belt 56 therebetween on the inclined surfaces 92.

Figure 3B:
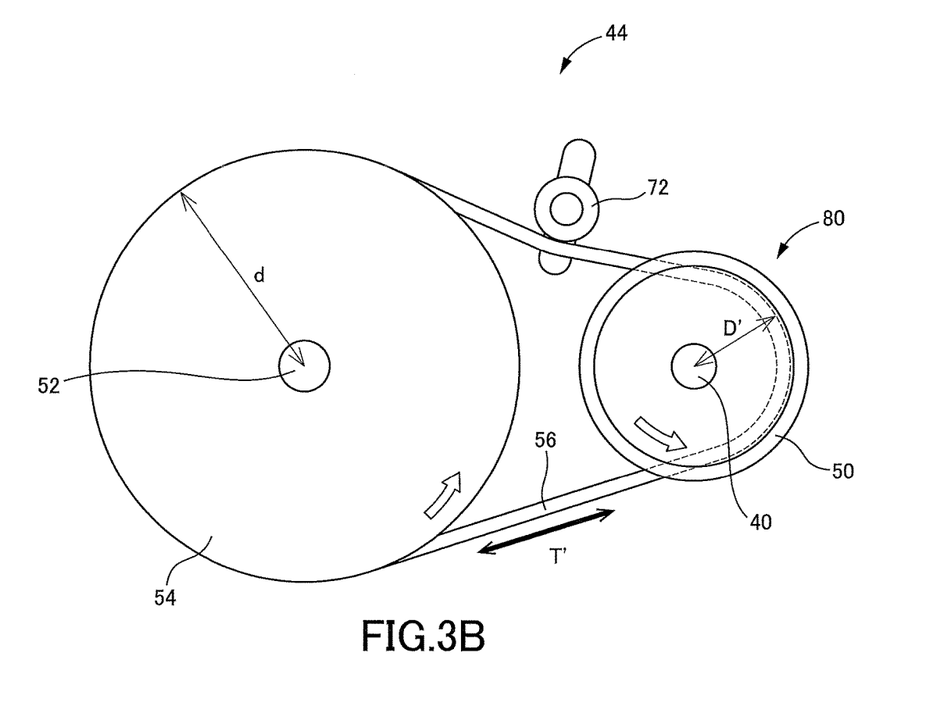
Figure 4B:
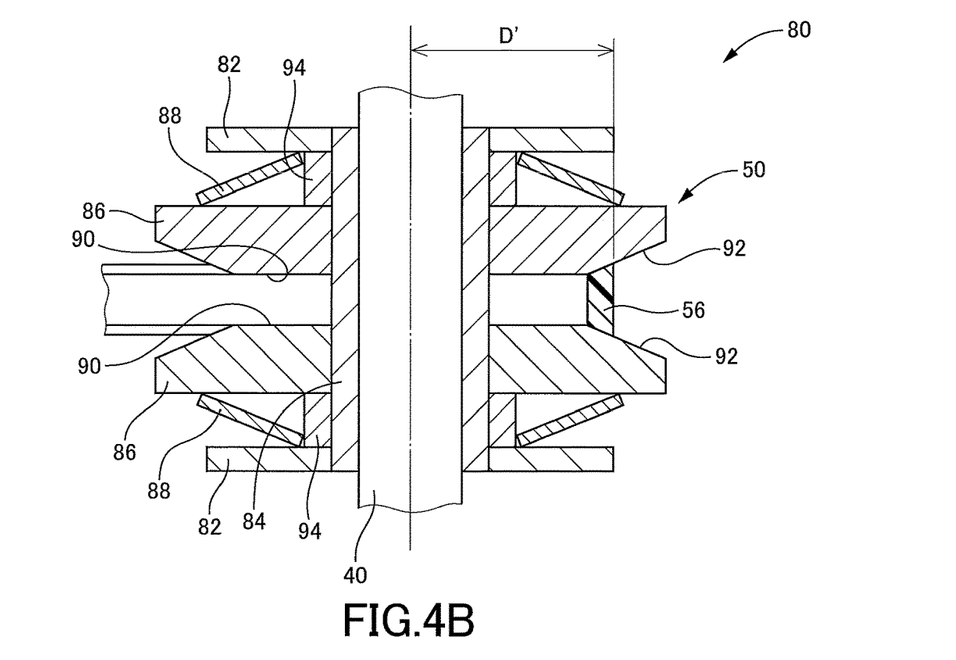

As apparent from FIG. 3A, tension T is acting on the belt 56. There will be considered a case in which the electric motor 38 is rotated forwardly, and the drive pulley 50 is rotated forwardly, as indicated in the white arrow in FIG. 3A. FIG. 3A shows the belt-type transmitting mechanism 44 in the piston-idly-moving state. The tension T is comparatively small in the piston-idly-moving state. When the braking-force generating state as described above is established, the tension T increases at one of two portions of the belt 56 located between the drive pulley 50 and the driven pulley 54, as shown in FIG. 3B, in accordance with the braking force. In FIG. 3B, the increased tension is indicated as tension T'. The increase in the tension T causes the state of the belt-type transmitting mechanism 44 to be changed into the state shown in FIGS. 3B and 4B. Here, the radius of a portion of the drive pulley 50 at which the belt 56 engages with the drive pulley 50 is defined as a pulley radius D (FIGS. 3A and 4A). The pulley radius D becomes smaller with an increase in the tension T, as shown in FIGS. 3B and 4B. In FIGS. 3B and 4B, the decreased pulley radius is indicated as a pulley radius D'. In the present embodiment, the belt 56 is formed of a hard material that does not easily cause a change in the cross-sectional shape of the belt 56 due to its elastic deformation.

Specifically, when the tension T increases, there is generated a force that moves the drive pulley 50 toward the driven pulley 54. In the state shown in FIG. 4A, a set load by biasing forces of the disc springs 88 is acting on the pulley plates 86. When the tension T exceeds set tension, the belt 56 moves toward the center of the motor shaft 40 such that the belt 56 slides on the inclined surfaces 92 of the pulley plates 86 while forcibly opening up the spacing between the pulley plates 86 of the drive pulley 50 against the biasing forces of the disc springs 88, as shown in FIG. 4B. That is, the radius of a portion of the belt 56 at which the belt 56 engages with the drive pulley 50 is decreased. Thus, the pulley radius D of the drive pulley 50 is decreased.

The driven pulley 54 is a known ordinary one. Unlike the drive pulley 50, a pulley radius d of the driven pulley 54 does not change even when the tension T increases. Consequently, a rotation transmission ratio of the belt-type transmitting mechanism 44, namely, a ratio of a rotation speed of the driven pulley 54 with respect to a rotation speed of the drive pulley 50, i.e., a rotation speed ratio R, changes to a rotation speed ratio R' when the pulley radius of the drive pulley 50 changes from D to D'.

$$R=D/d \rightarrow R'=D'/d$$

The pulley radius D is larger than the pulley radius D' (D>D'). That is, the pulley radius of the drive pulley 50 becomes smaller with an increase in the tension of the belt 56 from T to T'. In other words, the drive pulley 50 is a speed change pulley configured such that the pulley radius D becomes smaller with an increase in the tension T. The speed change mechanism 80 is thus constructed. As apparent from the above formulas, the rotation speed ratio R becomes smaller with a decrease in the pulley radius D of the drive pulley 50.

As apparent from FIG. 4B, the sleeve 84 is provided with stopper rings 94 disposed inward of the respective flanges 82. When the tension T increases to a given degree, each stopper ring 94 functions as a stopper, so as to prevent the spacing between the pulley plates 86 from becoming larger beyond a given degree. That is, the spacing between the pulley plates 86 is prevented from becoming larger than the set spacing. Consequently, the rotation speed ratio R' is prevented from becoming smaller than a given degree. The function of the stopper rings 94 as stoppers and the function of the stopper surfaces 90 of the pulley plates 86 as stoppers are combined with each other, so that a range of the rotation speed ratio R to be changed is limited, namely, an upper limit and a lower limit of the rotation speed ratio are set, in the speed change mechanism 80 of the present embodiment.

Figure 5:
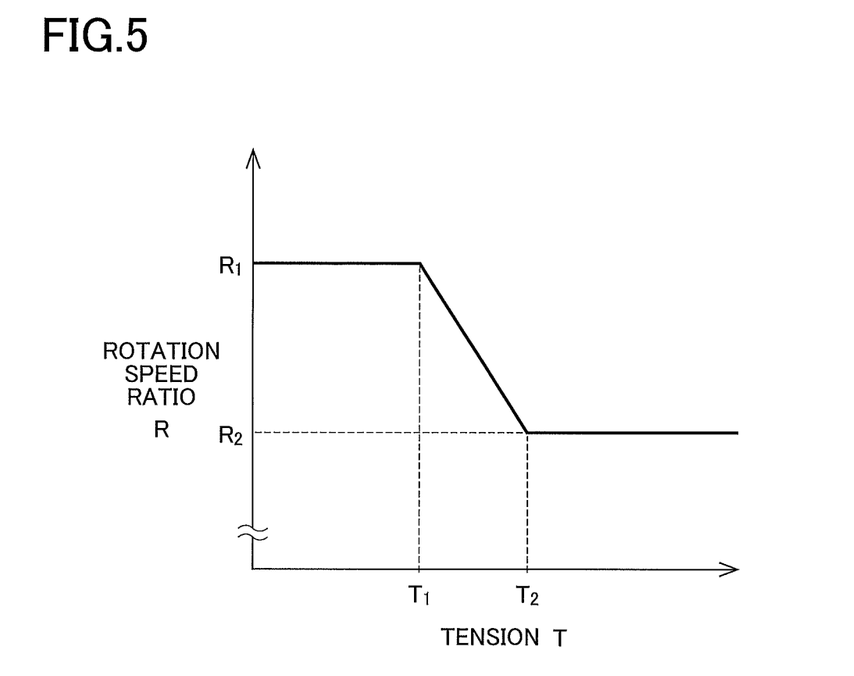
FIG. 5 is a graph showing a relationship between tension of a belt and rotation speed ratio in the speed change mechanism of the electric brake device according to the first embodiment.

The change of the rotation speed ratio R in dependence on the change of the tension T in the speed change mechanism 80 is indicated in a graph of FIG. 5. When the tension T increases and exceeds tension $T_1$, the rotation speed ratio R starts to decrease from $R_1$. When the tension T thereafter exceeds tension $T_2$, the rotation speed ratio R becomes constant at $R_2$.

Owing to the change of the rotation speed ratio R described above, the piston 20 is advanced at a relatively fast speed in the piston-idly-moving state. After the braking-force generating state has been established, a relatively large braking force can be generated even by the torque of the electric motor 38 having a relatively small size. Owing to the configuration of the speed change mechanism 80 described above, the electric brake device enables generation of a sufficient braking force with good response using a relatively small-sized electric motor as the drive source.

Second Embodiment

An electric brake device according to a second embodiment differs from the electric brake device according to the first embodiment in the structure of the speed change mechanism. Specifically, the drive pulley and the belt are different from those of the first embodiment. Accordingly, the following explanation will be made focusing on portions of the electric brake device of the second embodiment different from the first embodiment, and other portions thereof will not be explained.

Figure 6A:
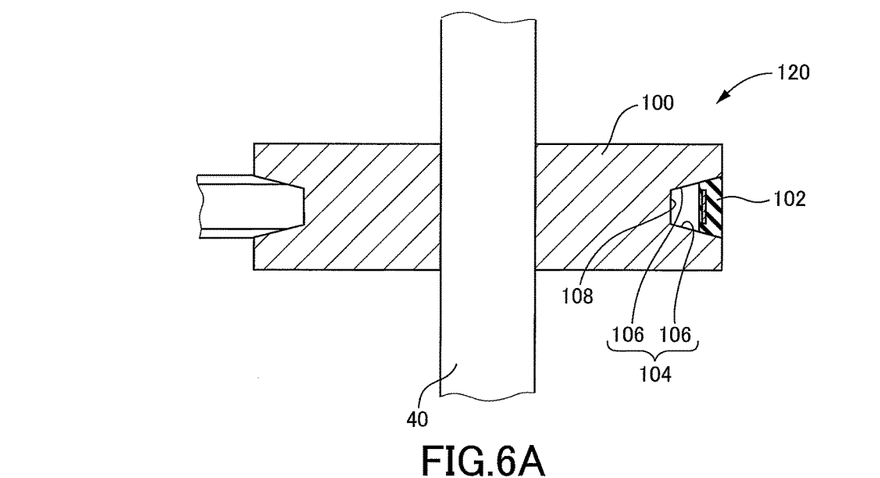
FIGS. 6A-6C are cross-sectional views each showing a drive pulley and a belt that constitute a speed change mechanism of an electric brake device according to a second embodiment.

FIG. 6A shows a drive pulley 100 and a belt 102 of a speed change mechanism of the electric brake device according to the second embodiment. Unlike the drive pulley 50 of the electric brake device of the first embodiment which is constituted by the pair of pulley plates 86, the drive pulley 100 of the electric brake device of the second embodiment is a single member and is fixed directly to the motor shaft 40 of the electric motor 38.

FIG. 6A shows the drive pulley 100 and the belt 102 in the piston-idly-moving state. As shown in FIG. 6A, an engaging portion 104 of the drive pulley 100 at which the drive pulley 100 engages with the belt 102 is formed as a groove including a pair of inclined surfaces 106 which face each other on the outer circumference of the drive pulley 100 with a spacing interposed therebetween. The spacing between the inclined surfaces 106 decreases toward the center of the drive pulley 100. The belt 102 engages with the drive pulley 100 on the inclined surfaces 106. In other words, unlike ordinary pulleys, a space is provided in the drive pulley 100 between a bottom surface 108 of the groove and the belt 102.

Figure 6B:
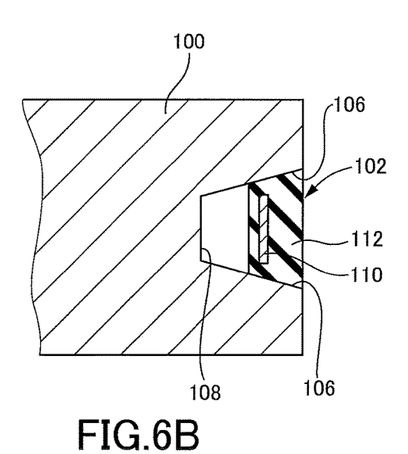
Figure 6C:
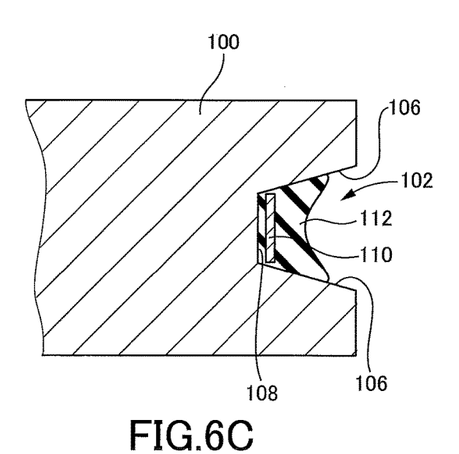

As shown in FIG. 6B which is an enlarged cross-sectional view of the belt 102, the belt 102 is constituted by a metal band member 110 as a core and a relatively soft elastic member 112 surrounding the band member 110. In the braking-force generating state, when the tension T of the belt 102 increases, the belt 102 is deformed such that its cross-sectional shape changes due to elastic deformation of the elastic member 112, and the belt 102 moves toward the center of the drive pulley 100, as shown in FIG. 6C. That is, the position of the belt 102 at which the belt 102 engages with the engaging portion 104 of the drive pulley 100 becomes closer to the center of the drive pulley 100 with an increase in the tension of the belt 102, in dependence on its elastic deformation. As a result, the pulley radius D of the drive pulley 100 becomes smaller as in the electric brake device of the first embodiment, and the rotation speed ratio R accordingly becomes smaller with an increase in the tension of the belt 102. When the tension T increases to a given level, the belt 102 comes into contact with the bottom surface 108, whereby the movement of the belt 102 toward the center of the drive pulley 100 is restricted and the rotation speed ratio R becomes substantially constant thereafter. The band member 110 may be formed of a material other than metal, such as Kevlar®.

A speed change mechanism 120 of the electric brake device of the second embodiment is constituted by the speed change pulley provided by the drive pulley 100 constructed as described above and the belt 102 which is configured such that its cross-sectional shape changes by the elastic deformation as described above. The operation and the advantage of the electric brake device by the speed change mechanism 120 are similar to those of the electric brake device of the first embodiment, and a detailed explanation thereof is dispensed with.

Figure 7A:
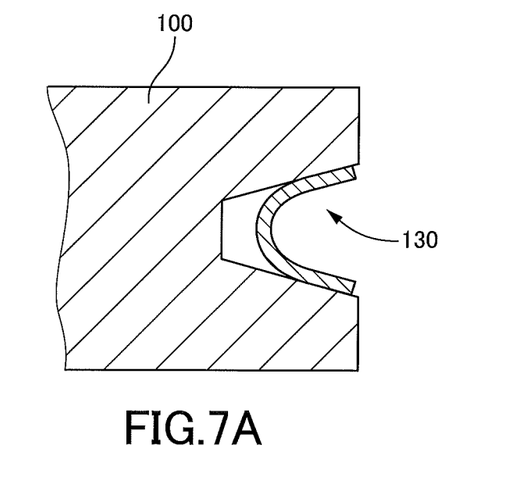
FIGS. 7A-7B are cross-sectional views each showing another belt employable as the belt that constitutes the speed change mechanism of the electric brake device according to the second embodiment.
Figure 7B:
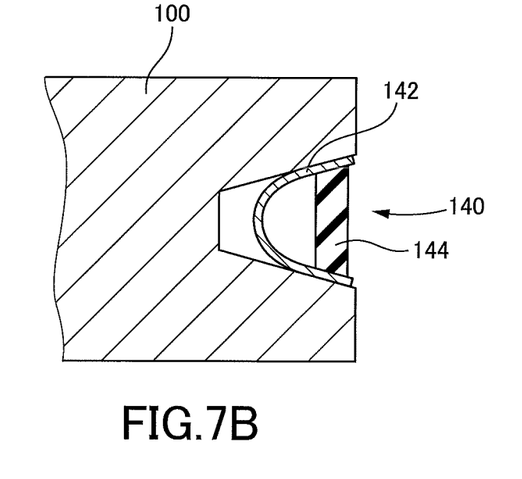

The belt 102 of the electric brake device of the second embodiment may be changed as shown in FIGS. 7A and 7B. FIG. 7A shows a belt 130 in cross section. The belt 130 is formed by bending a thin metal plate. FIG. 7B shows a belt 140 in cross section. The belt 140 is constituted by: a band-like main member 142 formed by bending a thin metal plate so as to have a generally U-like cross section; and a relatively soft band-like spring member 144 (formed of rubber, for instance) disposed between two facing portions of the main member 142 and functioning as a spring. Like the belt 102, the belt 130, 140 is also configured such that a position of the belt 130, 140 at which the belt 130, 140 engages with the engaging portion 104 becomes closer to the center of the drive pulley 100 with an increase in the tension thereof, in dependence of elastic deformation thereof.

What is claimed is:

1. An electric brake device configured to brake a wheel or to maintain a stopped state of the wheel, the electric brake device comprising:
    (a) a friction member to be pushed onto a rotary body configured to rotate with the wheel;
    (b) a piston configured to advance so as to push the friction member onto the rotary body;
    (c) a motion converting mechanism having an input shaft and configured to convert rotation of the input shaft into an advancing and retracting movement of the piston;
    (d) an electric motor as a drive source; and
    (e) a rotation transmitting mechanism configured to transmit rotation of the electric motor as the rotation of the input shaft,
    wherein the rotation transmitting mechanism includes
    e-1) a drive pulley connected to the electric motor,
    e-2) a driven pulley connected to the input shaft,
    e-3) a belt wound around the drive pulley and the driven pulley, and
    e-4) a speed change mechanism configured to change a ratio between a rotation speed of the driven pulley and a rotation speed of the drive pulley based on a change in a tension of the belt between the drive pulley and the driven pulley.

2. The electric brake device according to claim 1, wherein the speed change mechanism is configured to change the ratio such that the ratio decreases as the tension of the belt increases.

3. The electric brake device according to claim 1, wherein at least one of the drive pulley and the driven pulley is a speed change pulley including (A) a pair of pulley plates disposed so as to sandwich the belt therebetween in an axial direction and engaging with the belt on inclined surfaces of the respective pulley plates and (B) a biasing member biasing at least one of the pulley plates such that the pulley plates relatively move toward each other, the speed change pulley being configured such that, when the tension of the belt becomes larger than a set tension, a spacing between the pulley plates is increased against a biasing force of the biasing member, so that a pulley radius of the speed change pulley becomes smaller, the pulley radius being a radius of a portion of the speed change pulley at which the belt engages with the speed change pulley, and the speed change mechanism is constituted by at least one of the drive pulley and the driven pulley provided as the speed change pulley.

4. The electric brake device according to claim 3, wherein the speed change pulley includes a stopper configured to prevent the spacing between the pulley plates from becoming larger than a set spacing.

5. The electric brake device according to claim 3, wherein the speed change pulley includes a stopper configured to prevent the spacing between the pulley plates from becoming smaller than a set spacing.

6. The electric brake device according to claim 1, wherein at least one of the drive pulley and the driven pulley is a speed change pulley including an engaging portion having a pair of inclined surfaces which face each other on an outer circumference of the speed change pulley, the inclined surfaces being configured such that a spacing therebetween decreases toward a center of the speed change pulley, the belt engaging with the speed change pulley on the inclined surfaces, the belt has a configuration in which a position of the belt at which the belt engages with the engaging portion becomes closer to the center of the speed change pulley with an increase in the tension of the belt, in dependence on elastic deformation of the belt, and the speed change mechanism is constituted by: the speed change pulley provided by the at least one of the drive pulley and the driven pulley; and the belt.

7. The electric brake device according to claim 1, wherein the speed change mechanism is configured so that the ratio between the rotation speed of the driven pulley and the rotation speed of the drive pulley changes automatically in accordance with the change in the tension.

* * * * *